United States Patent
Zaitsev et al.

(10) Patent No.: US 9,860,452 B2
(45) Date of Patent: Jan. 2, 2018

(54) USAGE OF FIRST CAMERA TO DETERMINE PARAMETER FOR ACTION ASSOCIATED WITH SECOND CAMERA

(71) Applicant: Lenovo (Singapore) Pte. Ltd., New Tech Park (SG)

(72) Inventors: Grigori Zaitsev, Durham, NC (US); Scott Wentao Li, Cary, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/711,563

(22) Filed: May 13, 2015

(65) Prior Publication Data

US 2016/0337598 A1 Nov. 17, 2016

(51) Int. Cl.
*H04N 5/232* (2006.01)
*H04N 5/225* (2006.01)
*H04N 5/247* (2006.01)

(52) U.S. Cl.
CPC ....... *H04N 5/23296* (2013.01); *H04N 5/2258* (2013.01); *H04N 5/232* (2013.01); *H04N 5/247* (2013.01); *H04N 5/2259* (2013.01); *H04N 5/23212* (2013.01); *H04N 5/23219* (2013.01)

(58) Field of Classification Search
None
See application file for complete search history.

(56) References Cited

U.S. PATENT DOCUMENTS

| | | |
|---|---|---|
| 5,801,919 A | 9/1998 | Griencewic |
| 6,141,052 A | 10/2000 | Fukumitsu et al. |
| 6,201,554 B1 | 3/2001 | Lands |
| 6,590,764 B2 | 7/2003 | Silverstein |
| 6,812,958 B1 | 11/2004 | Silvester |
| 6,933,981 B1 | 8/2005 | Kishida et al. |
| 7,019,784 B1 | 3/2006 | Shibuya et al. |
| 7,391,443 B2 | 6/2008 | Kojima et al. |
| 7,450,834 B2 | 11/2008 | Makii et al. |
| 7,903,143 B2 | 3/2011 | Seddik et al. |
| 8,866,840 B2 | 10/2014 | Dahl et al. |
| 2001/0004269 A1 | 6/2001 | Shibata et al. |
| 2002/0191102 A1 | 12/2002 | Yuyama et al. |
| 2003/0228847 A1 | 12/2003 | Matsumoto |
| 2004/0017479 A1 | 1/2004 | Nakakubo et al. |
| 2004/0048633 A1 | 3/2004 | Sato et al. |
| 2004/0056964 A1 | 3/2004 | Kawai et al. |
| 2005/0047773 A1 | 3/2005 | Satake et al. |
| 2005/0073155 A1 | 4/2005 | Weng |
| 2005/0134717 A1 | 6/2005 | Misawa |
| 2005/0225667 A1 | 10/2005 | Yamakose |

(Continued)

OTHER PUBLICATIONS

Dent, Steve "Gionee Elife E7 mini launched with Oppo-like swivel camera, octa-core CPU", Retrieved on Jul. 25, 2014, http://www.engadget.com/2013/12/25/gionee-elife-e7-mini-launch/.

(Continued)

*Primary Examiner* — Roberto Velez
*Assistant Examiner* — Quan Pham
(74) *Attorney, Agent, or Firm* — John L. Rogitz; John M. Rogitz

(57) ABSTRACT

In one aspect, a device includes a processor, a first camera accessible to the processor, a second camera accessible to the processor, and storage accessible to the processor. The storage bears instructions executable by the processor to receive input from the first camera and, based at least in part on the input from the first camera, determine at least one parameter for at least one action associated with the second camera.

22 Claims, 7 Drawing Sheets

(56) References Cited

U.S. PATENT DOCUMENTS

| | | | |
|---|---|---|---|
| 2005/0263600 A1 | 12/2005 | Yang et al. | |
| 2005/0276009 A1 | 12/2005 | Kim | |
| 2006/0044396 A1 | 3/2006 | Miyashita et al. | |
| 2006/0061962 A1 | 3/2006 | Oakley | |
| 2006/0268157 A1 | 11/2006 | Chang | |
| 2008/0062291 A1* | 3/2008 | Sako | G02B 27/0093 348/294 |
| 2008/0080846 A1* | 4/2008 | Grip | G02B 7/287 396/51 |
| 2008/0205874 A1 | 8/2008 | Chen | |
| 2009/0002548 A1 | 1/2009 | Liang et al. | |
| 2009/0231483 A1 | 9/2009 | Seddik et al. | |
| 2010/0020182 A1 | 1/2010 | Wang et al. | |
| 2012/0038546 A1* | 2/2012 | Cromer | G06F 1/1626 345/156 |
| 2013/0148002 A1 | 6/2013 | Kim et al. | |
| 2013/0176474 A1* | 7/2013 | Kim | H04N 5/23293 348/333.11 |
| 2013/0191910 A1* | 7/2013 | Dellinger | G06F 3/0488 726/19 |
| 2013/0258089 A1* | 10/2013 | Lyons | H04N 5/23212 348/77 |
| 2014/0139667 A1* | 5/2014 | Kang | H04N 5/23296 348/143 |
| 2014/0184550 A1* | 7/2014 | Hennessey | G06F 3/013 345/173 |
| 2014/0184854 A1* | 7/2014 | Musatenko | H04N 5/23296 348/240.2 |
| 2015/0003819 A1* | 1/2015 | Ackerman | G02B 7/287 396/51 |
| 2015/0288923 A1* | 10/2015 | Kim | H04N 5/23296 348/14.05 |
| 2015/0338915 A1* | 11/2015 | Publicover | H04N 5/23229 345/633 |
| 2015/0363153 A1* | 12/2015 | Kato | G06F 3/14 345/629 |
| 2016/0291690 A1* | 10/2016 | Thorn | H04N 5/232 |

OTHER PUBLICATIONS

Kwan, Michael "Get the Oppo N1 Android Smartphone for Only $99", Oct. 15, 2013, http://www.mobilemag.com/2013/10/15/get-oppo-n1-android-smartphone-99/.

Christopher Miles Osborne, Michael William Stuart Ripp, Wesley Abram Luttrell, "Device with Camera at or Near Junction of First Panel and Second Panel", related pending U.S. Appl. No. 14/471,408, filed Aug. 28, 2014.

* cited by examiner

USAGE OF FIRST CAMERA TO DETERMINE PARAMETER FOR ACTION ASSOCIATED WITH SECOND CAMERA

FIELD

The present application relates generally to usage of a first camera to determine at least one parameter for an action associated with a second camera.

BACKGROUND

Currently, controlling zooming and focus for a camera, included on a device such as a smart phone or tablet is relatively difficult, especially when one-handed control of the device is desired. Even when two hands are available, it is still often difficult to hold the device in one hand and attempt to provide input to zoom or focus with the other hand.

SUMMARY

Accordingly, in one aspect a device includes a processor, a first camera accessible to the processor, a second camera accessible to the processor, and storage accessible to the processor. The storage hears instructions executable by the processor to receive input from the first camera and, based at least in part on the input from the first camera, determine at least one parameter for at least one action associated with the second camera.

In another aspect, a method includes using a first camera on a device to generate at least a first image comprising at least a portion of a user, identifying at least one parameter based at least on the first image, and using a second camera different from the first camera to generate a second image based at least in part on the at least one parameter.

In still another aspect, a computer readable storage medium that is not a transitory signal comprises instructions executable fey a processor to use input from a first camera on a device to determine a parameter for generating an image using a second camera on the device different from the first camera.

The details of present principles, both as to their structure and operation, can best be understood in reference to the accompanying drawings, in which like reference numerals refer to like parts, and in which:

DETAILED DESCRIPTION

Figure 1:
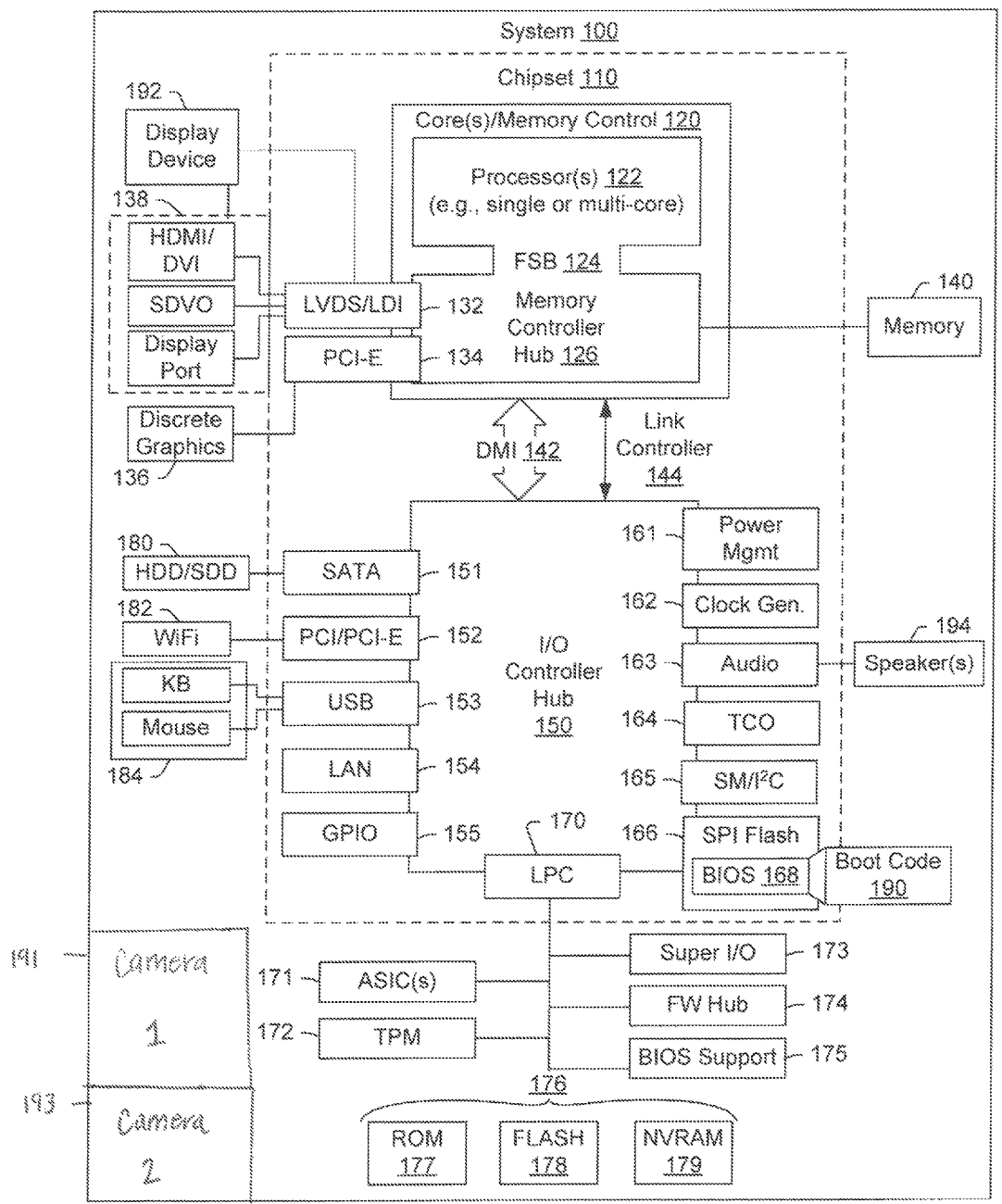
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network, such as the Internet, a local intranet, or a virtual, private network.

As used herein, instructions refer to computer-implemented, steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential, signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 also includes a first camera 191 and a second camera 193, with each one configured for gathering and/or generating one or more images and providing input related thereto to the processor 122. The cameras 191 and 193 may be thermal imaging cameras, digital cameras such as webcams, three-dimensional (3D) cameras, and/or cameras otherwise integrated into the system 100 and controllable by the processor 122 to generate pictures/images and/or video.

Additionally, though now shown for clarity, in some embodiments the system 100 may include a gyroscope for sensing and/or measuring the orientation of the system 100 and providing input related thereto to the processor 122, an accelerometer for sensing acceleration, and/or movement of the system 100 and providing input related thereto to the processor 122, and/or an audio receiver/microphone providing input to the processor 122 based on, e.g., a user providing audible input to the microphone. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

Figure 2:
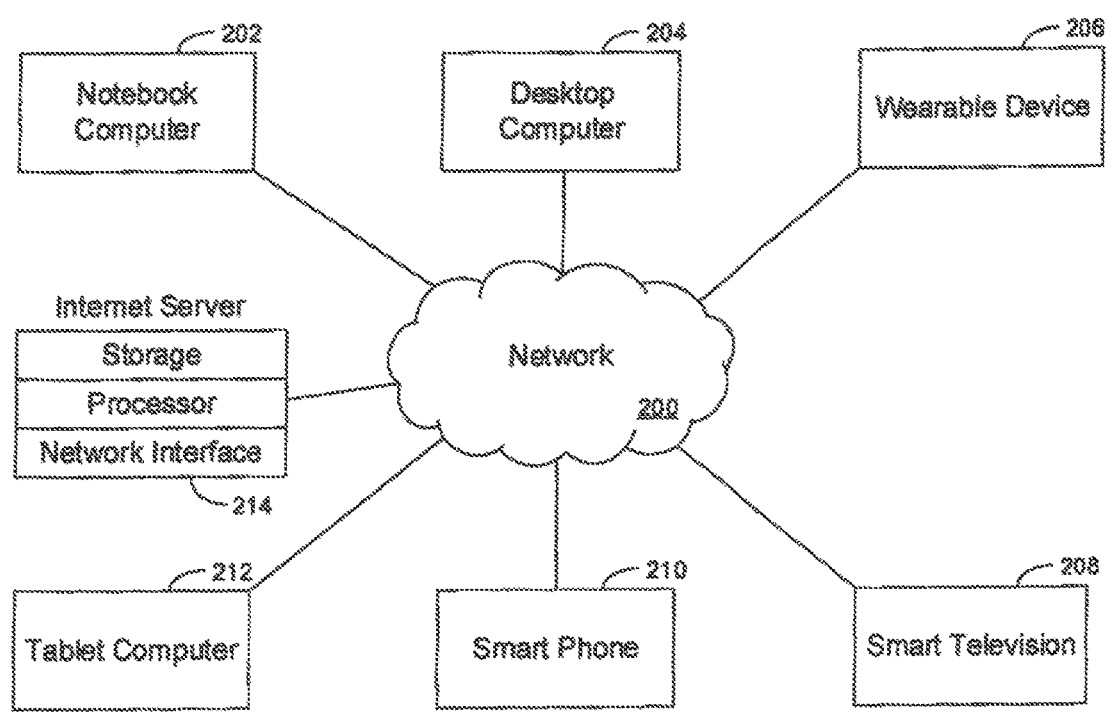
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as the Internet in accordance with present principles. It is to be understood that each of the devices described in reference to FIG. 2 may include at least some of the features, components, and/or elements of the system 100 described above. In any case, FIG. 2 shows a notebook computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It Is to be understood that the devices 202-214 are configured to communicate with each other over the network 200 to undertake present principles.

FIGS. 3A and 3B show an example device 300 in accordance with present principles, which may be a smart phone or tablet computer and may include some or all of the components described above in reference to the system 100. FIG. 3A shows the device 300 from a front-side, upright orientation perspective, while FIG. 3B shows the device 300 from a back-side, upright orientation perspective. FIG. 3A shows that the front side of the device 300 may bear a display 302 and at least one camera 304. FIG. 3B shows that the back side of the device 300 may bear another camera 306. Accordingly, it may be appreciated in accordance with present principles that the camera 304 may be used to generate at least one image of a user while the user is holding the device 300 upright with, the back side of the device 300 facing away from the user, while the camera 306 may thus be used to generate at least one image in accordance with its field of view, and vice versa.

Figure 3:
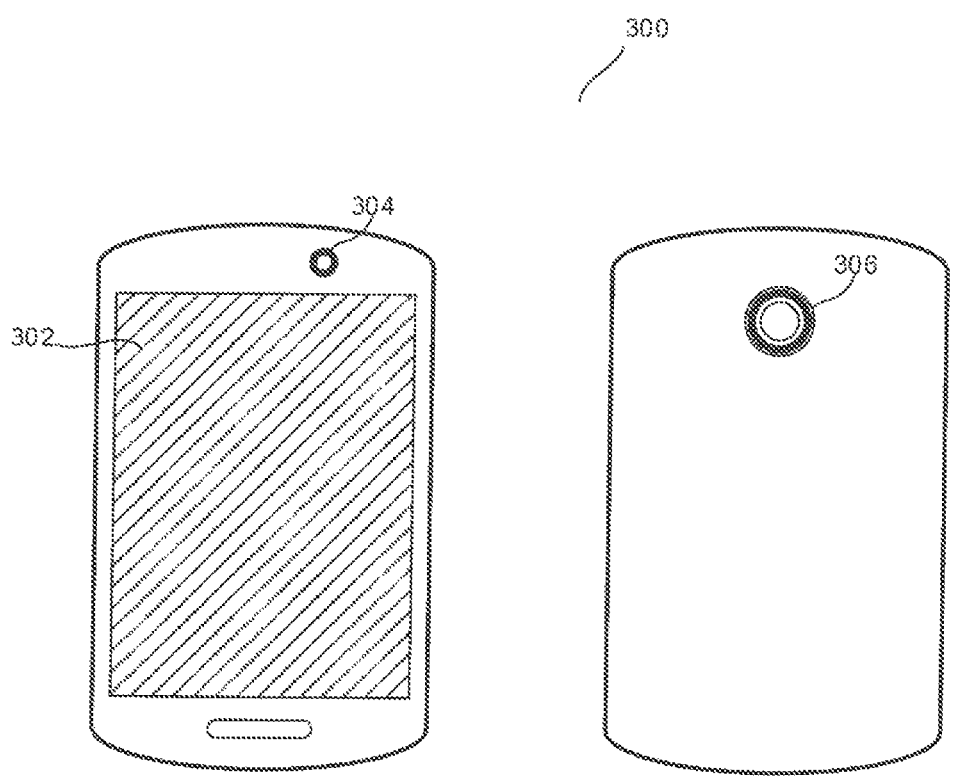
FIGS. 3A and 3B are block diagrams of an example device that has "front" and "back" cameras in accordance with present principles.
Figure 4:
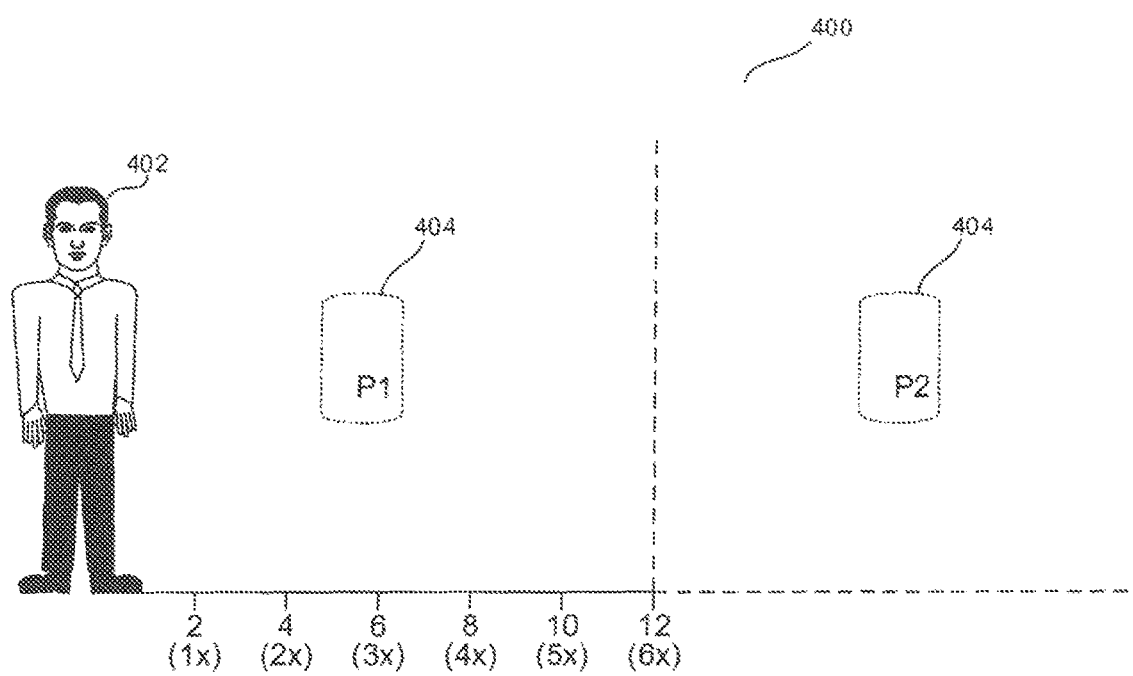
FIG. 4 is an example illustration in accordance with present principles.

Before moving on to the description of FIG. 4, it is to also be understood in reference to FIG. 3 that either or both of the cameras 304 and 306 may be disposed on an electrically-actuatable swivel or other element which under control of the processor of the device 300 permits at least bi-directional horizontal rotation of the cameras 304 and 306. This rotation may be used to, e.g., control a direction of orientation of a field of view of the respective camera to correspond at least substantially (e.g., as best as possible based on the capabilities of the device) to a direction in which a user is looking as will be set forth further below, although it is to also be understood that the direction of orientation of the field of view may be established digitally as well even when such a camera is not rotated to be physically oriented in the direction.

Now referring to FIG. 4, it shows an example illustration 400 in accordance with present principles. A user 402 is shown and controls a device 404 which may be similar in function and configuration to the system 100 described above. The numbers shown extending away from the user 402 in the illustration 400 are understood to represent respective numbers of inches away from the user 402, and specifically may be numbers of inches away from the user's eyes. Note that below each number is a respective notation in parenthesis understood to correspond to a different zoom amount for each of the respective distances.

Thus, it is to be understood that each of the distances (or in other embodiments, distance ranges) is associated with a respective zoom amount. Accordingly, as the user 402 moves the device 404 closer or farther front the user 402 within the example range of zero to twelve inches (as determined by the device 404), the device uses input from a first camera on the device 404 facing the user one or both of to change a zoom amount for zooming using a second camera on the other side of the device 404 facing away from the user 402, and/or to control a focus of the second camera.

As may be appreciated from FIG. 4, at position one the device 404 has been juxtaposed at six inches away from the user. The device 404 identifies the user as being six inches away and in response determines that a zoom amount designated "3×" is an amount for which to zoom using the second camera facing away from the user. However, note that when the device 404 is at position two as shown to the right of position one and beyond a twelve inch threshold, no zoom amount and/or focus will be determined by the device 404. It is to be understood that this distance threshold relative to the user 402 beyond which the device 404 does not control zooming and/or a focus may be used in some example embodiments but not others (e.g., as enabled or disabled by a user by providing input to the device 404). It is to therefore fee understood that in embodiments where the distance threshold, is not used, the device 404 may control zooming and focus beyond the example distance of twelve inches illustrated in FIG. 4.

Figure 5:
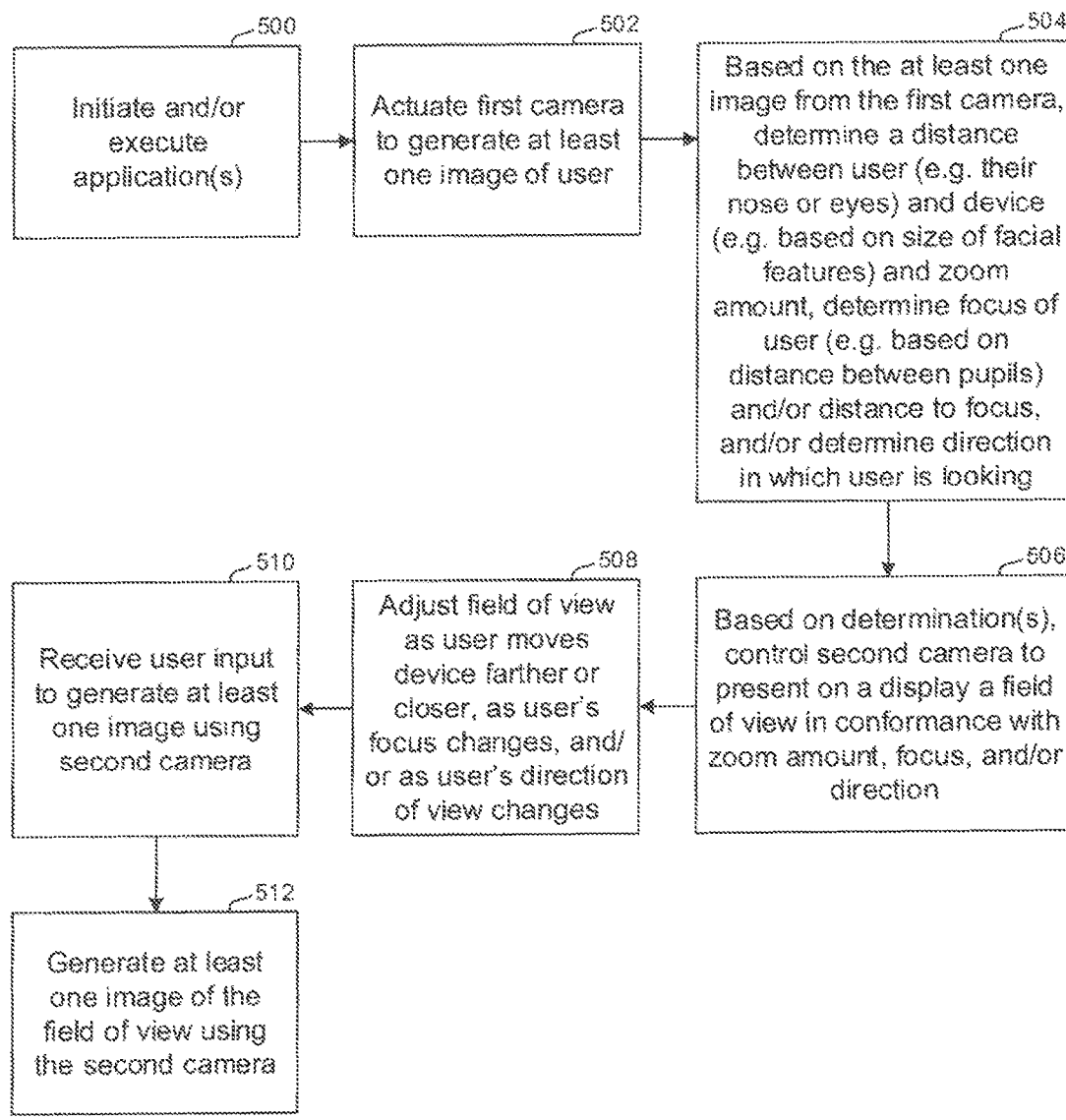
FIG. 5 is a flow chart showing an example algorithm in accordance with present principles.

FIG. 5 shows example logic that may be undertaken by a device such as the system 100 in accordance with present principles (referred to below as the "present device"). Beginning at block 500, the logic initiates and/or executes one or more applications for undertaking present principles, such as a camera application, an image generating application, a distance determining application, an eye tracking application, a combination of one or more of the foregoing, etc. From block 500 the logic moves to block 502 where the logic actuates a first camera on the present device, such as a "front" camera on the same side of the present device as the present device's display, to identify at least a portion of a user based on input from the "front" camera and to generate at least one image using the "front" camera, which comprises at least the portion of a user.

Responsive to the generation of the at least one image, the logic moves to block 504 where the logic, based on the at least one image, one or more of determines a distance between the user (such as their eyes and/or nose, in particular) and the present device (e.g., based on the identified size of a facial feature(s) as shown in the at least one image as will be described further below) and hence a zoom amount based on the distance, determines a focus of the user (e.g., based on an identified distance between the user's pupils) and/or a distance from the user to the focus of the user, and/or determines a direction in which the user is looking. The determinations may be made using eye tracking software, object recognition software, and/or a three-dimensional (3D) camera to generate the images.

Then, responsive to the one or more determinations made at block 504, the logic moves to block 506 where the logic controls a second camera on the present device, such as a "back" camera of the device on an opposite side of the device than the side bearing the display, to generate at least one image based on the determined distance(s), focus, and/or direction and to present on the display the at least one image, where the at least one image presented on the display has a field of view in conformance with the zoom amount, focus, and/or direction. From block 506 the logic moves to block 508 where the logic may, based on additional images generated using the first camera, adjust the field of view at least substantially in real time (e.g., in real time, at least substantially in real time as best as possible based on processing capabilities of the present device, at least substantially in real time based on a threshold adjustment delay configured by a programmer such as two seconds delayed from real time, etc.) as the user moves the device farther or closer to their face, adjusts their focus, and/or adjusts their direction of view. The logic then proceeds to block 510.

At block 510 the logic receives user input to generate at least one image using the second camera. Responsive to receipt of the user input to generate the at least one image, the logic moves to block 512 where it generates and stores at least one image using the second camera in conformance with the zoom amount, focus, and/or direction of view as determined at either or both of block 504 and block 508.

Describing the determination of distance from the user to the present device in more detail, it is to be understood that various methods may be used, and furthermore in some embodiments the methods may be combined with object recognition to identify distances to particular portions of the user. For instance, the distance may be determined using a laser rangefinder on the present device, an ultrasonic rangefinder on the present device, and/or a three-dimensional (3D) camera on the present device. For the laser rangefinder and ultrasonic rangefinder, the time it takes for the laser or sound wave to travel from the present device to the object and back to the present device may be used to determine the distance based on this time. The distance may also be determined using a parallax-based rangefinder and/or based on triangulation using images generated relatively close in time by one or more cameras on the present device.

Still further, the distance may be determined based on the identified size of a facial feature(s) of a user as shown in an image. For instance, prior to undertaking the logic of FIG. 5, the present device may be calibrated by generating images of the particular user's face (such as using a default zoom amount and a default image definition/resolution) at various distances of the user to the present device that are input by the user and/or otherwise identified by the present device. The present device may then analyze the images and, upon executing object recognition to identify one or more facial features of the user (such as at least one eye, a nose, at least one ear, a mouth, a chin, at least one cheek, a forehead, or a hair line) and/or the user's head, may determine a number of pixels that are used to show the respective facial feature and/or head m each image generated at a different distance. The present device may associate these respective numbers of pixels with the distances for later reference (e.g., in a data table), and/or may derive other distances at which a user is located relative to the present device based on other pixel amounts in between the calibration distances (e.g., by using an average derived from the calibration data for an amount of pixels, for each respective facial feature, per unit of distance).

For example, suppose five hundred pixels are used in one picture, as taken from a distance of one foot using a default zoom amount and default image resolution, to show a user's face. Also suppose that one thousand pixels are used in a second picture, as taken from a distance of two feet but using the same default zoom amount and default image resolution, to show the user's face. These identifications during calibration of numbers of pixels for the users face at various distances can be used at a later time to identify a distance between the user and the device using an image with the same default zoom amount and default image resolution and also showing the user's face.

For example, if seven hundred fifty pixels are used to show the users face in such an image, the device may determine, based on an identified average of a two hundred fifty pixel difference per half foot using the same default zoom amount and default image resolution, that a user's face is one and a half feet away from the device. A change in this distance may then be identified at least substantially in real time using this average as the user changes the distance between their face and the device.

Figures 6, 7:
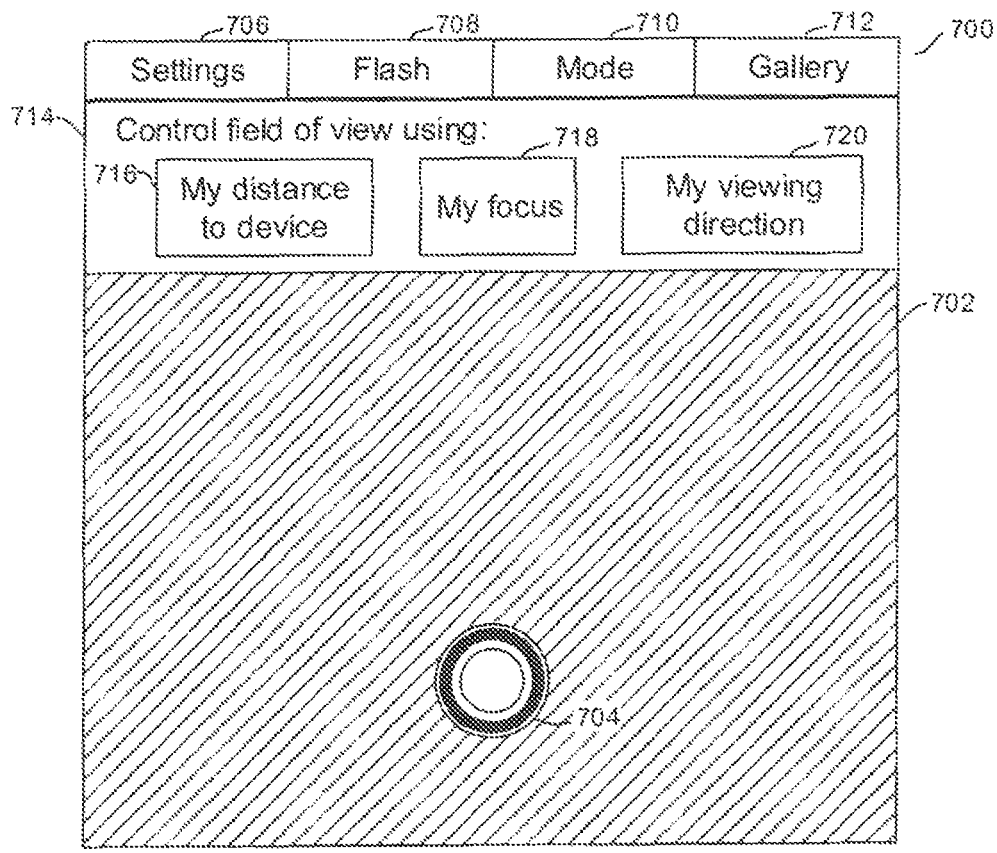
FIG. 6 is an example data table in accordance with present principles.
FIGS. 7 and 8 are example user interfaces (UIs) in accordance with present principles.

Now describing FIG. 6, it shows an example data table 600 that may be used in accordance with present principles, such as by the logic outlined above in reference to FIG. 5, for determining a zoom amount based on an identified distance between a device and a user. The data table 600 includes a first column 602 listing respective distance ranges at various entries, and it also includes a second column 604 listing various zoom amounts for each of the entries.

Accordingly, once a device identifies a distance from a user to the device, the device may access the data table 600 (which may be stored on the device or somewhere else accessible to the device) and parse the distance ranges in the first column 602 until a match of the identified distance is made to a range for one of the entries in which the identified distance falls. The device may then access the zoom amount indicated in column 604 for the respective entry to thus identify a zoom amount for zooming a camera in accordance with present principles.

As an example, suppose the device identifies the distance between the user and the device to be 2.8 centimeters. The device may access the column 602 and continue downward from the top until, the second range of two and a half centimeters to six centimeters is reached, at which point the device would identity 2.8 centimeters as being within this range. The device may then access the data for the entry in column 604, which in this case is a zoom amount of 2×. The device may then generate an image by zooming in or out to the zoom amount of 2× and then generate an image.

Continuing the detailed description in reference to FIG. 7, it shows an example user interface (UI) 700 presentable on a display of a device undertaking present principles. The UI 700 may be associated with a camera application and used for previewing fields of view of cameras on the device. An area 702 presents a field of view, while selector 704 is selectable to automatically without further user input cause the device to generate and save an image corresponding to a given field of view at or around the time that the selector 704 is selected.

The UI 700 also includes a settings selector 706 which is selectable to command the device to present a UI for configuring settings associated with the camera(s) of the device (such as the UI 800 of FIG. 8 to be described below). Additionally, the UI 700 includes a flash selector 708 which is selectable to turn a flash on or off, a mode selector 710 which is selectable to change modes for the camera(s) (e.g., a still frame mode or a video mode), and a gallery selector 712 which is selectable to command the device to present, e.g., a thumbnail listing of previously generated images which have been saved to the device or elsewhere such as in cloud storage.

Still in reference to FIG. 7, the UI 700 may also include an area 714 bearing various selectors for controlling a field of view of a "back" camera using a "front" camera in accordance with present principles (where such a field of view may be presented at the area 702). Thus, a selector 716 is presented which, is selectable to automatically without further user input configure the device to control an amount of zoom based on the distance between the user and the device. A selector 718 is also presented which is selectable to automatically without further user input configure the device to control a focus of the camera to correspond to a focus of the user on an object in the field of view (to thus focus the camera on the object). Still further, a selector 720 is presented which is selectable to automatically without further user input configure the device to control a direction of orientation of the field of view to correspond to a direction in which the user is looking (to thus actuate the camera to have a field of view oriented in the direction).

Figure 8:
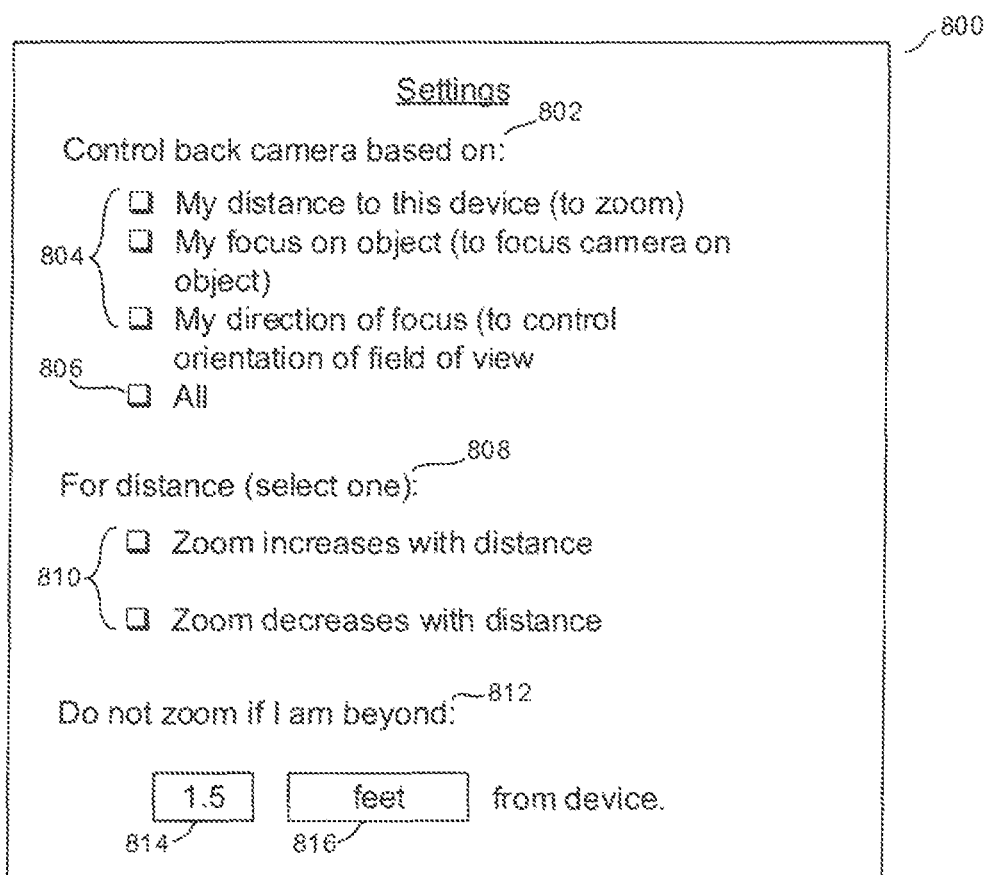

Before moving on to the description of FIG. 8, it is to be understood that the UI 700 of FIG. 7 may also present thereon various data related to the zoom, focus, and direction parameters determined by the device based on the current characteristics of the user. For example, a top portion of the area 702 beneath the area 714, and/or a portion of the area 714, may present data indicating a zoom amount, focal length, and/or distance to a focus of the camera, and/or a direction of the field of view (e.g., relative to the orthogonal of a plane established by the side of the device bearing the "back" camera). For instance, the area 714 may indicate beneath the selectors 716-720 a zoom amount of 3×, a distance to focus of ten feet, and a direction of three degrees to the left of center. Even further, in some embodiments the device may Indicate in the area 702 the object and/or area identified as being focused on by the user, such as by superimposing (on the representation of the field of view presented, in the area 702) a circle around and/or arrow pointing at the object and/or area.

Now describing the UI 800 of FIG. 8 mentioned above, it is a UI for configuring settings of a device undertaking present principles and is presentable on a display of such a device. The UI 800 includes a first setting 802 listing various methods of controlling a field of view of a "back" camera, where each of the methods listed are automatically without further user input enableable by selecting their respective check box 804 presented on the UI 800. As may be appreciated from the FIG. 8, the methods include controlling an amount of zoom based on a distance between a user and the device to thus control zooming for the camera, controlling a focus of the camera to correspond to a focus of the user on an object/area in the field of view to thus focus the camera on the object/area, and controlling a direction of orientation of the field of view to correspond to a direction in which the user is looking. Also note that a check box 806 is shown which is selectable to automatically without further user input enable all of the methods listed simply by selecting the box 806.

The UI 800 also includes a second setting 808 of options for configuring zooming using the camera to either progressively zoom in as the distance between the user and the device becomes greater or to progressively zoom-out as the distance between the user and the device becomes greater. Thus, respective corresponding check boxes 810 are presented to enable each one, with only one of the options able to be enabled at any one time.

Still in reference to FIG. 8, the UI 800 also includes a setting 812 to establish a threshold distance between a user and the device at or beyond which the device ceases to zoom in or out based on the distance between the user and the device. Accordingly, a number entry box 814 is shown at which a user may enter or select a number, while an increment entry box 816 is shown at which a user may enter or select a distance increment to be associated with the number to thus establish the threshold distance. As may be appreciated from FIG. 8, in the present example the threshold distance has been established as one and a half feet.

Describing in more detail how a device in accordance with present principles may determine a focus of a user based on the distance between the user's pupils, it is to generally be understood that the closer the user's pupils are to each other, the closer an object or area is to the user that is being focused on by the user. Thus, eye tracking software, objection recognition software, and/or distance determining software may be used to identify the user's pupils and the distance therebetween from at least one image. This data can be used to, e.g., identify a vertical focal plane at a distance from the device corresponding at least substantially to (e.g., as best as possible based on the capabilities of the device) a distance at which an object and/or area being focused on by the user is located, or to otherwise identify a distance corresponding at least substantially to the distance at which an object and/or area being focused on by the user is located (such as based on the distance between the user's pupils alone as identified using a three dimensional (3D) camera and without identifying the vertical focal plane). In any case, a camera can then have its focal plane and/or focus adjusted to correspond to the focal plane and/or focus of the user to thus generate an image having at least substantially the same focus as the user's eyes.

Furthermore, it is to be understood in accordance with present principles that in addition to or in lieu of determining a zoom amount based on a distance between a user and a device, a focus may be determined based on the distance. For example, the user may configure the device (e.g., using a settings UI such as the UI 800 described above) to focus more or less using the camera as the distance changes between the user and the device.

Still further, if the user determines that this focusing, and/or a zoom which occurs based on the change in distance, is incorrect or unintended, the user may provide a gesture such as shaking their head (e.g., back and forth, left to right and vice versa) which is identified by the device based on input from the "front" camera gathering images of the gesture and based on execution of gesture recognition software using the images. In response to the identification of the head shake gesture, the device may revert to a previous zoom amount and/or focus which was used prior to the most recent zoom and/or focus change that was executed.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular USAGE OF FIRST CAMERA TO DETERMINE PARAMETER FOR ACTION ASSOCIATED WITH SECOND CAMERA is herein shown and described in detail, it is to be understood that the subject matter which is encompassed by the present application is limited only by the claims.

What is claimed is:

1. A device, comprising:
   a processor;
   a first camera accessible to the processor and a second camera accessible to the processor; and
   storage accessible to the processor and bearing instructions executable by the processor to:
   receive first input from the first camera;
   based at least in part on the first input from the first camera, control a focal length of the second camera to focus on the object;
   present at least one user interface (UI) comprising:
   at least first and second selectors selectable to input respective first and second controls for at least a field of view of the second camera; and
   at least a third selector selectable to automatically enable the first and second controls.

2. The device of claim 1, wherein the instructions are executable to:
   control the second camera based at least in part on a setting configured before receipt of the first input to enable the device to control the focal length based on objects being focused on by the user.

3. The device of claim 2, comprising a display accessible to the processor, and wherein the instructions are executable by the processor to:
   present, on the display, a user interface (UI) comprising a selector that is selectable to configure the setting to enable the device to control the focal length.

4. The device of claim 1, wherein the instructions are executable to:
   based at least in part on the first input from the first camera, identify at least one facial feature of the user; and
   based at least in part on the identification of the at least one facial feature, identify the object.

5. The device of claim 1, wherein the instructions are executable to:
   based at least in part on the first input from the first camera, determine a distance between pupils of the user; and
   based at least in part on the distance, identify the object and control the focal length of the second camera to focus on the object.

6. The device of claim 1, wherein the instructions are executable to:
   receive a command to generate at least one image; and
   in response to receipt of the command, generate at least one image, using the second camera, according to the focal length.

7. The device of claim 1, wherein the instructions are executable to:
   based at least in part on second input from the first camera, determine a direction in which the user is looking and determine at least a second parameter different from focal length based on the direction in which the user is looking;
   receive a command to generate at least one image; and
   in response to receipt of the command, actuate the second camera to generate at least one image using at least the second parameter so that a field of view of the second camera is oriented at least toward the direction.

8. The device of claim 7, comprising swivel that rotates the second camera, and wherein the instructions are executable by the processor to:
   control the swivel to rotate the second camera so that the second camera is oriented to generate at least one image having the field of view in response to receipt of the command.

9. The device of claim 1, wherein the instructions are executable by the processor to:
   control the focal length based at least in part on a distance from the user to the device.

10. The device of claim 1, comprising a display accessible to the processor, and wherein the instructions are executable by the processor to:
    present, on the display, an image from the second camera that is generated using the focal length.

11. The device of claim 1, wherein the instructions are executable by the processor to:
    adjust, based on input from the first camera, the focal length of the second camera as a distance between the user and the device changes.

12. A method, comprising:
    actuating a first camera on a device to generate at least a first image comprising at least a portion of a user;
    generating a second image from a second camera based at least in part on the first image;
    presenting at least one user interface (UI) comprising:
    a first area presenting a field of view;
    at least a first selector is selectable to generate an image corresponding to a field of view in the first area;
    at least second and third selectors, the second selector selectable to control an amount of zoom of the second camera based on a distance between a user and the device, the third selector being selectable to control a focus of the second camera to correspond to a focus of the user on an object in the field of view.

13. The method of claim 12, comprising:
    identifying a focus amount based at least in part on a focus of the user to generate the second image using the focus amount.

14. The method of claim 12, comprising:
    presenting, on a display, a user interface (UI) that comprises a selector that is selectable to configure the device to control the focus of the second camera.

15. The method of claim 12, comprising:
    Presenting, on a display of the device, the second image from the second camera.

16. The method of claim 12, comprising:
adjusting, based on input from the first camera, the focus of the second camera as a distance between the user and the device changes.

17. The method of claim 12, wherein the UI comprises:
a fourth selector selectable to control a direction of orientation of the field of view to correspond to a direction in which the user is looking.

18. A computer readable storage medium that is not a transitory signal, the computer readable storage medium comprising instructions executable by a processor to:
use input from a first camera on a device to determine a focal length for a second camera on the device to generate an image using the second camera and the focal length;
present at least one user interface (UI) comprising:
at least first and second selectors selectable to input respective first and second controls for at least a field of view of the second camera; and
at least a third selector selectable to automatically enable the first and second controls.

19. The computer readable storage medium of claim 18, wherein the instructions are executable by the processor to:
receive a command; and
responsive to receipt of the command, actuate the second camera to generate the image using the focal length.

20. The computer readable storage medium of claim 19, wherein the instructions are executable by the processor to:
identify, to determine the focal length, a focus of the user based on the input from the first camera.

21. The computer readable storage medium of claim 18, wherein the instructions are executable by the processor to:
present, on a display, a user interface (UI) that comprises a selector that is selectable to configure the device to determine the focal length for the second camera based on input from the first camera.

22. The computer readable storage medium of claim 18, wherein the instructions are executable by the processor to:
adjust, based on input from the first camera, the focal length for the second camera as a distance between a user and the device changes.

* * * * *